US008605606B2

(12) United States Patent
Terry et al.

(10) Patent No.: US 8,605,606 B2
(45) Date of Patent: Dec. 10, 2013

(54) METHOD AND APPARATUS FOR TRIGGERING RADIO LINK CONTROL PACKET DISCARD AND RADIO LINK CONTROL RE-ESTABLISHMENT

(75) Inventors: Stephen E. Terry, Northport, NY (US); Mohammed Sammour, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 593 days.

(21) Appl. No.: 12/330,807

(22) Filed: Dec. 9, 2008

(65) Prior Publication Data

US 2009/0161571 A1 Jun. 25, 2009

Related U.S. Application Data

(60) Provisional application No. 61/012,731, filed on Dec. 10, 2007.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......................................... 370/252; 370/328

(58) Field of Classification Search
None
See application file for complete search history.

(56) References Cited

U.S. PATENT DOCUMENTS

| 6,546,247 B1 | 4/2003 | Foti et al. |
| 2003/0007459 A1* | 1/2003 | Yi et al. .................. 370/252 |
| 2005/0054298 A1 | 3/2005 | Chen |
| 2007/0258489 A1 | 11/2007 | Jiang |

FOREIGN PATENT DOCUMENTS

WO 2006/100475 9/2006

OTHER PUBLICATIONS

Third Generation Partnership Project, "Technical Specification Group Radio Access Network; Evolved Universal Terrestrial Radio Access (E-UTRA) Radio Resource Control(RRC); Protocol Specification (Release 8)", 3GPP TS 36.331, V8.3.0, (Sep. 2008).
Third Generation Partnership Project, "Technical Specification Group Radio Access Network; Evolved Universal Terrestrial Radio Access (E-UTRA) Radio Resource Control(RRC); Protocol Specification (Release 8)", 3GPP TS 36.331, V0.5.0 (Nov. 2007).

(Continued)

*Primary Examiner* — Jay Y Lee
(74) *Attorney, Agent, or Firm* — Volpe and Koenig, P.C.

(57) ABSTRACT

A method and apparatus for triggering radio link control (RLC) re-establishment and/or protocol data unit (PDU) discard are disclosed. An RLC entity maintains a state variable for counting a total number of transmissions and/or retransmissions of an RLC PDU and its PDU segments. If the state variable reaches a threshold, the RLC entity initiates RLC re-establishment and/or discards the RLC PDU and PDU segments. The state variable may be incremented each time a negative acknowledgement is received for at least a portion of the RLC PDU or when a retransmission is considered for the RLC PDU or a portion of the RLC PDU. The RLC entity may increase a state variable proportionate to a retransmitted data size. The RLC entity may maintain separate state variables for the RLC PDU and PDU segments and counts the number of transmissions and/or retransmissions for the RLC PDU and the PDU segments.

15 Claims, 5 Drawing Sheets

(56) References Cited

OTHER PUBLICATIONS

Third Generation Partnership Project, "Technical Specification Group Radio Access Network; Evolved Universal Terrestrial Radio Ascess (E-UTRA) Radio Link Control (RLC) Potocol Specification (Release 8)", 3GPP TS 36.322, V1.0.0, (Sep. 2007).
Third Generation Partnership Project, "Technical Specification Group Radio Access Network; Evolved Universal Terresterial Radio Access (E-UTRA) Radio Link Control (RLC) Potocol Specification (Release 8)", 3GPP TS 36.322, V8.3.0, (Sep. 2008).
Third Generation Partnership Project, "Technical Specification Group Radio Access Network; Evolved Universal Terrestrial Access (E-UTRA) and Evolved Universal Terrestrial Radio Access Network (E-UTRAN); Overall description; State 2 (Release8)", 3GPP TS36.300, V8.0.0, (Mar. 2007).
Third Generation Partnership Project, "Technical Specification Group Radio Access Network; Evolved Universal Terrestrial Access (E-UTRA) and Evolved Universal Terrestrial Radio Access Network (E-UTRAN); Overall description; State 2 (Release8)", 3GPP TS36.300, V8.6.0, (Sep. 2008).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.3.0, (Sep. 2008).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V0.5.0, (Nov. 2007).
Third Generation Partnership Project, "Technical Specification Group Radio Access Network; Evolved Universal Terrestrial Radio Access (E-UTRA) Radio Link Control (RLC) Protocol Specification (Release 8)", 3GPP TS 36.322, V1.0.0, (Sep. 2007).
Third Generation Partnership Project, "Technical Specification Group Radio Access Network; Evolved Universal Terrestrial Radio Access (E-UTRA) Radio Link Control (RLC) Protocol Specification (Release 8)", 3GPP TS 36.322, V8.3.0, (Sep. 2008).
Third Generation Partnership Project, "Technical Specification Group Radio Access Network; Radio Link Control (RLC) Protocol Specification (Release 8)," 3GPP TS 25.322, V8.0.0, (Dec. 2008).
Third Generation Partnership Project, "Technical Specification Group Radio Access Network; Evolved Universal Terrestrial Access (E-UTRA) Medium Access Control (MAC) Protocol Specification (Release 8)", 3GPP TS 36.321, V1.0.0, (Sep. 2007).
Third Generation Partnership Project, "Technical Specification Group Radio Access Network; Evolved Universal Terrestrial Access (E-UTRA) Medium Access Control (MAC) Protocol Specification (Release 8)", 3GPP TS 36.321, V8.3.0, (Sep. 2008).
Third Generation Partnership Project, "Technical Specification Group Radio Access Network; Evolved Universal Terrestrial Access (E-UTRA) Radio Link Control (RLC) Protocol Specification (Release 8)", 3GPP TS 36.322, V1.2.0, (Nov. 2007).
Azcorra et al., "Multicast Congestion Control for Active Network Services," European Transactions on Telecommunications, vol. 10, Issue 3, pp. 309-317, (Jun. 1999).
Qualcomm Europe, "Clarification on abortion of RLC Reset Procedure," 3GPP TSG RAN WG2 Meeting #53 (May 8-12, 2006).
Third Generation Partnership Project, "Technical Specification Group Radio Access Network; Evolved Universal Terrestrial Radio Access (E-UTRA) Radio Resource Control (RRC); Protocol Specification (Release 8)", 3GPP 36.331, V8.3.0, (Sep. 2008).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V0.5.0 (Nov. 2007).
Third Generation Partnership Project, "Technical Specification Group Radio Access Network; Evolved Universal Terrestrial Radio Access (E-UTRA) Radio Link Control (RLC) Potocol Specification (Release 8)", 3GPP TS 36.322, V1.0.0, (Sep. 2007).
Third Generation Partnership Project, "Technical Specification Group Radio Access Network; Evolved Universal Terrestrial Radio Access (E-UTRA) Radio Link Control (RLC) Potocol Specification (Release 8)", 3GPP TS 36.322, V8.3.0, (Sep. 2008).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; State 2 (Release8)", 3GPP TS36.300, V8.0.0, (Mar. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; State 2 (Release8)", 3GPP TS36.300, V8.2.0, (Sep. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; State 2 (Release8)", 3GPP TS36.300, V8.6.0, (Sep. 2008).
Third Generation Partnership Project, "Technical Specification Group Radio Access Network; Radio Link Control (RLC) Protocol Specification (Release 6)," 3GPP TS 25.322, V6.10.0, (Jun. 2007).
Third Generation Partnership Project, "Technical Specification Group Radio Access Network; Radio Link Control (RLC) Protocol Specification (Release 6)," 3GPP TS 25.322, V6.12.0, (May 2008).
Third Generation Partnership Project, "Technical Specification Group Radio Access Network; Radio Link Control (RLC) Protocol Specification (Release 7)," 3GPP TS 25.322, V7.4.0, (Sep. 2007).
Third Generation Partnership Project, "Technical Specification Group Radio Access Network; Radio Link Control (RLC) Protocol Specification (Release 7)," 3GPP TS 25.322, V7.8.0, (Sep. 2008).
Third Generation Partnership Project, "Technical Specification Group Radio Access Network; Radio Link Control (RLC) Protocol Specification (Release 8)," 3GPP TS 25.322, V8.0.0, (Dec. 2007).
Third Generation Partnership Project, "Technical Specification Group Radio Access Network; Radio Link Control (RLC) Protocol Specification (Release 8)," 3GPP TS 25.322, V8.3.0, (Sep. 2008).
Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V1.0.0, (Sep. 2007).
Third Generation Partnership Project, "Technical Specification Group Radio Access Network; Evolved Universal Terrestrial Radio Access (E-UTRA) Medium Access Control (MAC) Protocol Specification (Release 8)", 3GPP TS 36.321, V8.3.0, (Sep. 2008).
Third Generation Partnership Project, "Technical Specification Group Radio Access Network; Evolved Universal Terrestrial Radio Access (E-UTRA) Radio Link Control (RLC) Protocol Specification (Release 8)", 3GPP TS 36.322, V1.2.0, (Nov. 2007).

* cited by examiner

METHOD AND APPARATUS FOR TRIGGERING RADIO LINK CONTROL PACKET DISCARD AND RADIO LINK CONTROL RE-ESTABLISHMENT

CROSS REFERENCE TO RELATED APPLICATIONS

This application claims the benefit of U.S. provisional application No. 61/012,731 filed Dec. 10, 2007, which is incorporated by reference as if fully set forth.

FIELD OF INVENTION

This application is related to wireless communications.

BACKGROUND

FIG. 1 shows a long term evolution (LTE) user-plane protocol stack. The user-plane includes a packet data convergence protocol (PDCP) entity, a radio link control (RLC) entity and a medium access control (MAC) entity.

The main functions of the RLC entity include transfer of upper layer protocol data units (PDUs) supporting acknowledged mode (AM), unacknowledged mode (UM), and transparent mode (TM) data transfer, error correction through automatic repeat request (ARQ), segmentation according to the size of the transport block (TB), re-segmentation of RLC PDUs that need to be retransmitted, concatenation of RLC service data units (SDUs) for the same radio bearer, in-sequence delivery of upper layer PDUs except at handover in the uplink, duplicate detection, protocol error detection and recovery, flow control between an evolved Node B (eNB) and a wireless transmit/receive unit (WTRU), SDU discard, RLC reset, or the like.

An RLC SDU may be segmented if the RLC SDU does not fit entirely into the TB. The RLC SDU may be segmented into variable sized RLC PDUs. If a retransmitted PDU does not fit entirely into the new TB used for retransmission, the RLC PDU may be re-segmented. The number of re-segmentation is not limited.

According to 3GPP TS 36.322 V1.2.0, the evolved universal terrestrial radio access network (E-UTRAN) RLC entity may perform SDU discard based on a notification from the PDCP entity above it, as opposed to having the RLC entity have its own SDU timer-based discard mechanism like in the Release 6 UTRAN RLC. According to 3GPP TS 36.322 V1.2.0, in E-UTRAN, a new re-segmentation functionality will be supported in addition to supporting segmentation. In addition to segmentation and reassembly of RLC SDUs, re-segmentation and reassembly of RLC PDUs will be supported (at least for AM data transfer).

FIG. 2 shows segmentation and re-segmentation of an RLC PDU. An RLC SDU may be segmented into RLC PDUs. Each RLC PDU is identified by a sequence number (SN) that is assigned on a per-RLC PDU basis, (i.e., a PDU SN). The RLC PDU SN is included in the RLC header. Segmentation of the RLC SDU into RLC PDUs may be performed once and an RLC SDU may not be segmented again. Instead, re-segmentation may be performed on RLC PDUs.

An RLC PDU may be segmented into PDU segments, (i.e., sub-segments). As shown in FIG. 2, a sub-segment may be identified by two parameters: a segment offset (SO) and a segment length (SL). The SO indicates the starting position of the segment within the original RLC PDU, (e.g., in bytes), and the SL indicates the length (size) of the segment, (e.g., in bytes).

RLC PDU re-segmentation may be performed multiple times without a limit according to 3GPP TS 36.322. FIGS. 3(A) and 3(B) show two RLC PDU re-segmentations (i.e., two occurrences of re-segmentation). In FIG. 3(A), the second sub-segment is larger than the first sub-segment. This might occur when the TB size selected by the lower layer is larger than the size of the first sub-segment that needs to be retransmitted. In FIG. 3(B), the second sub-segment is smaller than the first sub-segment. This might occur when the TB size selected by the lower layer is smaller than the size of the first sub-segment that needs to be retransmitted.

In the UTRAN, the RLC AM mode performs ARQ retransmissions. One of the parameters for the ARQ mechanism is the maximum number of transmissions, MaxDAT. MaxDAT represents the upper limit for state variable VT(DAT). The state variable VT(DAT) counts the number of times that an AMD PDU has been scheduled to be transmitted. There shall be one VT(DAT) for each RLC AMD PDU and each shall be incremented by one every time the corresponding AMD PDU is scheduled to be transmitted. The initial value of VT(DAT) is 0. When VT(DAT) equals MaxDAT, either an RLC reset procedure or an SDU discard procedure shall be initiated according to the configuration by the upper layer.

In the E-UTRAN, it has been agreed to support the RLC SDU discard functionality in the PDCP entity, (e.g., timer-based discard). The PDCP entity notifies the RLC entity of a discarded SDU/PDU so that the RLC entity discards it from its buffers.

However, there is a need for an RLC PDU (and in turn RLC SDU) discard criteria to be evaluated and implemented locally in the RLC entity itself. Such mechanism may be used to avoid protocol deadlock conditions, (e.g., indefinite retransmissions), and/or to trigger other procedures, such as RLC reset or re-establishment and RLC move receive window (MRW), and/or to support better quality of service (QoS). The UTRAN RLC provides an MRW procedure which is a signal sent by the sending RLC entity to request the receiving RLC entity to move its reception window, and optionally to indicate the set of discarded RLC SDUs as a result of an RLC SDU discard in the sending RLC entity.

In the UTRAN, the MaxDAT parameter was used to discard RLC PDUs based on the number of PDU (re)transmissions, and in turn trigger either an RLC reset procedure or an RLC MRW procedure. For the E-UTRAN, the straightforward MaxDAT parameter based on the number of PDU (re) transmissions may not be used due to the introduction of the new functionality of re-segmentation in the E-UTRAN, which makes the straightforward counting of PDU (re)transmissions inappropriate as a discard criterion for RLC PDUs.

Therefore, it would be desirable to provide methods and criteria to discard an RLC PDU, and/or in turn the corresponding RLC SDU(s), and/or to trigger other procedures, such as RLC reset or re-establishment.

SUMMARY

A method and apparatus for triggering RLC packet discard and/or RLC re-establishment are disclosed. An RLC entity maintains a state variable for counting a total number of transmissions and/or retransmissions of an RLC PDU and its PDU segments. If the state variable reaches, (i.e., equal to), a predetermined threshold, the RLC entity may discard the RLC PDU and segments of the RLC PDU and/or initiate RLC re-establishment. The state variable associated with the RLC PDU may be incremented each time a negative acknowledgement (NACK) is received for at least a portion of the RLC PDU or when a retransmission is considered for the RLC PDU or portion of the RLC PDU. The state variable associated with the RLC PDU may not be incremented when the RLC PDU or portion of the RLC PDU considered for retransmission is already pending retransmission.

Alternatively, the RLC entity may increase a state variable proportionate to a retransmitted data size of the RLC PDU or its PDU segments. The state variable counts a total data size of transmissions and/or retransmissions of the RLC PDU and its PDU segments, and if the state variable reaches or exceeds a predetermined threshold, the RLC entity may discard at least one of the RLC PDU and segments of the RLC PDU and/or initiate RLC re-establishment.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "eNB" includes but is not limited to a base station, a Node-B, a site controller, an access point (AP), or any other type of interfacing device capable of operating in a wireless environment.

Hereinafter, both "segmented PDU" and "re-segmented PDU" refer to "PDU segment", and the terminology "segmented PDU", "re-segmented PDU", "PDU segment", and "sub-segment" will be used interchangeably. When referred to hereafter, the terminology "RLC re-establishment" is used interchangeably with the terminology "RLC reset". When referred to hereafter, the term "packet" refers to RLC SDU, RLC PDU, or PDU segment.

In accordance with a first embodiment, the total number of transmissions or retransmissions is calculated for a given RLC PDU and its PDU segments to determine whether to discard such RLC PDU and/or to initiate an RLC re-establishment procedure. Alternatively, the total number of transmission failures, (e.g., the number of NACKs), for transmitted RLC PDUs or PDU segments may be calculated.

Two parameters, MaxTotalTrans and VT(TotalTrans), are defined. MaxTotalTrans is a threshold for deciding whether an RLC PDU needs to be discarded and/or if RLC needs to be reestablished. VT(TotalTrans) is a state variable counting the number of times an RLC PDU and its PDU segment has been (re)transmitted or when it is considered for retransmission. One VT(TotalTrans) is generated for an associated RLC PDU and incremented every time the RLC PDU or its PDU segment is (re)transmitted or scheduled to be (re)transmitted. The initial value of VT(TotalTrans) is 0. The VT(TotalTrans) may be initialized when the first time the RLC PDU is considered for retransmission.

Figure 1:
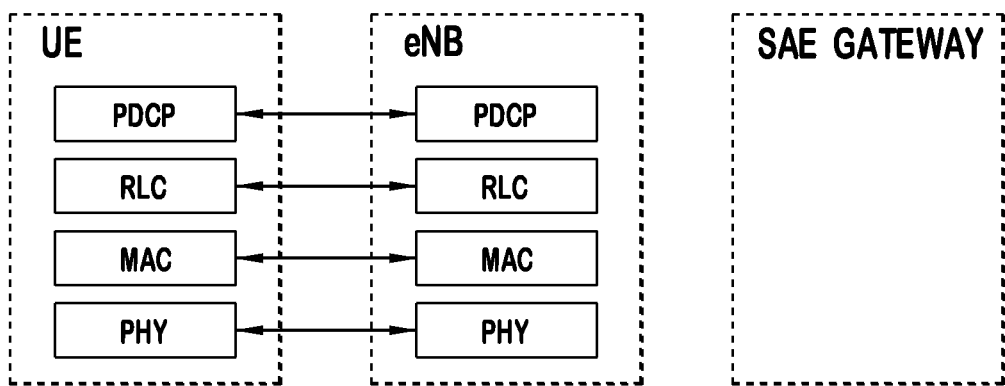
FIG. 1 shows a long term evolution (LTE) user-plane protocol stack.
Figure 2:
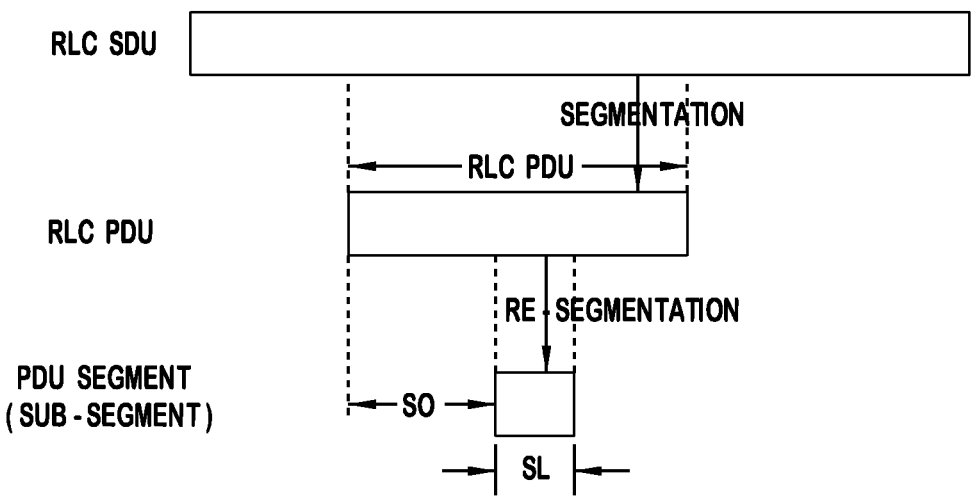
FIG. 2 shows segmentation and re-segmentation of an RLC PDU.
Figures 3A, 3B:
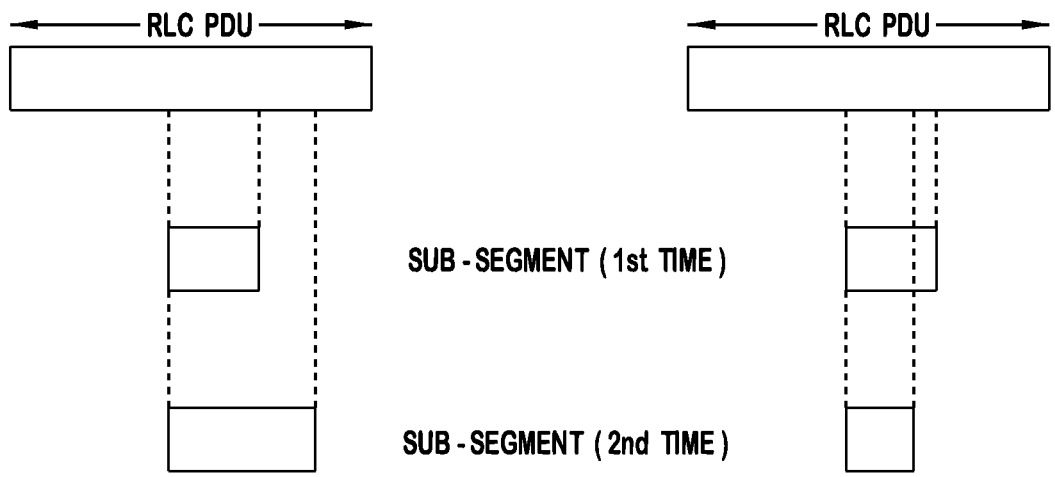
FIGS. 3(A) and 3(B) show two RLC PDU re-segmentations, respectively.
Figure 4:
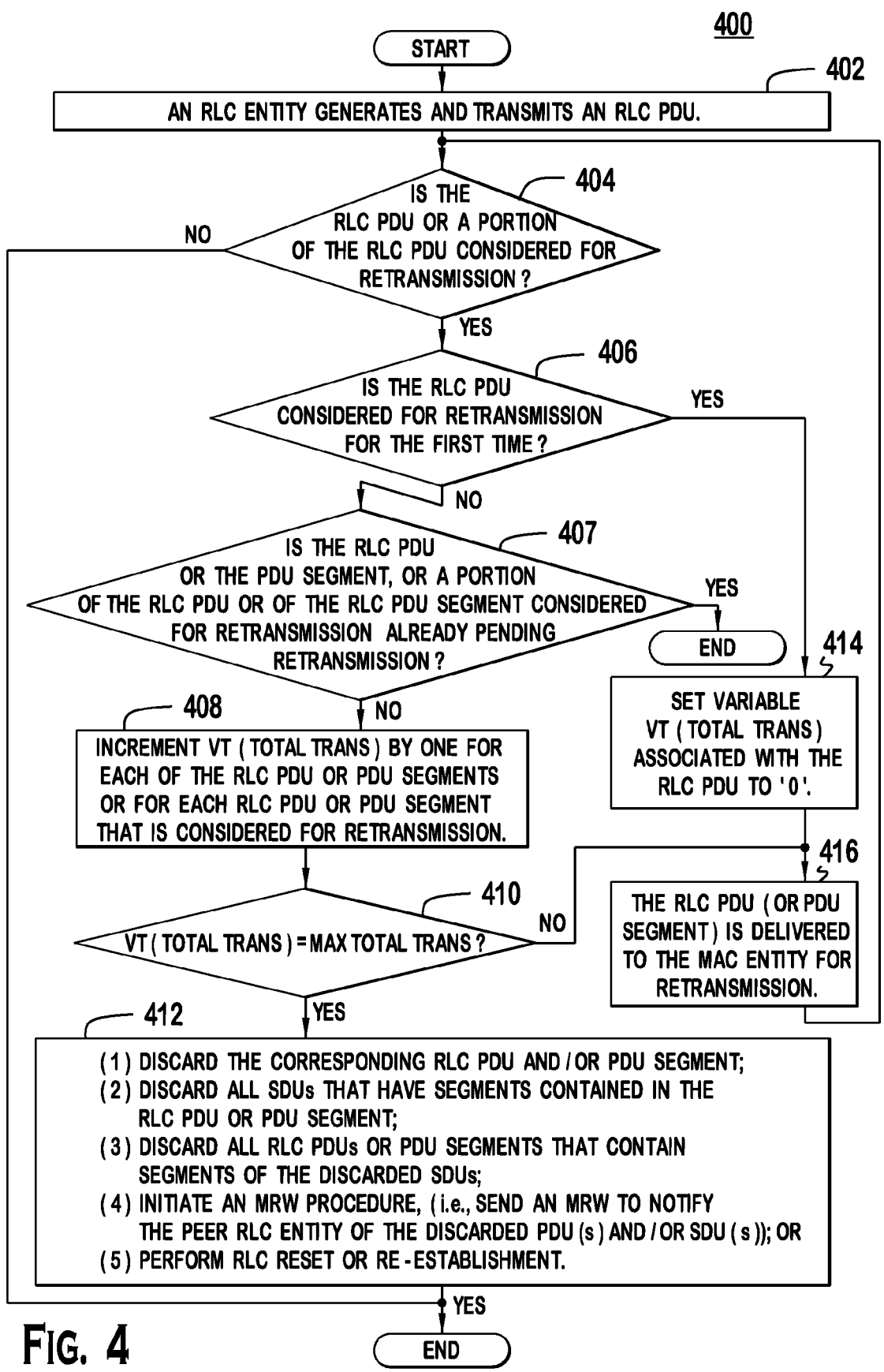
FIG. 4 is a flow diagram of a process for packet discard and/or RLC re-establishment in accordance with a first embodiment.

FIG. 4 is a flow diagram of a process 400 for RLC re-establishment and/or packet discard in accordance with the first embodiment. An RLC entity generates and transmits an RLC PDU (step 402). Subsequently, it is determined whether the RLC PDU or a portion of the RLC PDU is considered for retransmission (step 404). If the RLC PDU or a portion of the RLC PDU is not considered for retransmission, (i.e., transmission of the RLC PDU is successful), the process 400 ends.

If the RLC PDU or a portion of the RLC PDU is considered for retransmission, it is further determined whether the RLC PDU is considered for retransmission for the first time (step 406). If the RLC PDU is considered for retransmission for the first time, the variable VT(TotalTrans) associated with the RLC PDU is set to '0' (step 414) and the RLC PDU is delivered to the MAC entity for retransmission (step 416).

If it is not the first time that the RLC PDU or a portion of the RLC PDU is considered for retransmission, it is further determined whether the RLC PDU or the PDU segment, or a portion of the RLC PDU or of the RLC PDU segment considered for retransmission already pending retransmission, (e.g., the RLC PDU or a portion of the RLC PDU or PDU segment considered for transmission is already in the retransmission buffer), (step 407). If so, the process 400 ends. If not, the associated variable VT(TotalTrans) is incremented by one for each of the RLC PDU or PDU segments, (i.e., the number of retransmissions is counted), or for each PDU or PDU segment that is considered for retransmission, (i.e., the number of retransmission failures is counted) (step 408).

The state variable VT(TotalTrans) may not be incremented if the RLC PDU or a portion of the RLC PDU considered for retransmission is already pending retransmission or if a portion of the RLC PDU is already pending retransmission, (e.g., the RLC PDU or a portion of the RLC PDU considered for transmission is already in the retransmission buffer), to avoid double counting of retransmissions. It is then determined whether the variable VT(TotalTrans) is equal to the predetermined threshold (MaxTotalTrans) (step 410). If VT(TotalTrans) is not equal to MaxTotalTrans, the RLC PDU or a PDU segment is delivered to the MAC entity for retransmission (step 416).

If VT(TotalTrans) is equal to MaxTotalTrans, one or more of the following actions may be performed (step 412):

(1) Discard the corresponding RLC PDU and/or PDU segment;

(2) Discard all SDUs that have segments contained in the RLC PDU or PDU segment;

(3) Discard all RLC PDUs or PDU segments that contain segments of the discarded SDUs;

(4) Initiate an MRW procedure, (i.e., send an MRW to notify the peer RLC entity of the discarded PDU(s) and/or SDU(s)); and (5) Initiate RLC reset or re-establishment.

Alternatively, the state variable VT(TotalTrans) may be initialized when the RLC PDU is transmitted or retransmitted for the first time.

In accordance with a second embodiment, the total "size" of the transmitted and/or retransmitted data corresponding to a given RLC PDU is used to determine whether to discard the RLC PDU. The total number of bytes that are transmitted and retransmitted for a particular PLC PDU is calculated and used as a criterion for RLC PDU discard.

Two parameters, MaxBytes and VT(Bytes), are defined. MaxBytes is a threshold for deciding whether an RLC PDU needs to be discarded or not. VT(Bytes) is a state variable counting the number of bytes that are transmitted or scheduled to be transmitted in an RLC PDU or its PDU segments. There is one VT(Bytes) for each RLC PDU and VT(Bytes) is incremented by the size of the RLC PDU or its PDU segment every time the RLC PDU or its PDU segment(s) is (re)transmitted or scheduled to be (re)transmitted. The initial value of VT(Bytes) is zero.

It should be noted that although "bytes" are used as a unit of data size, other units may be used to represent the data size, (e.g., number of x bytes, number of slices or bits, or any other unit).

Figure 5:
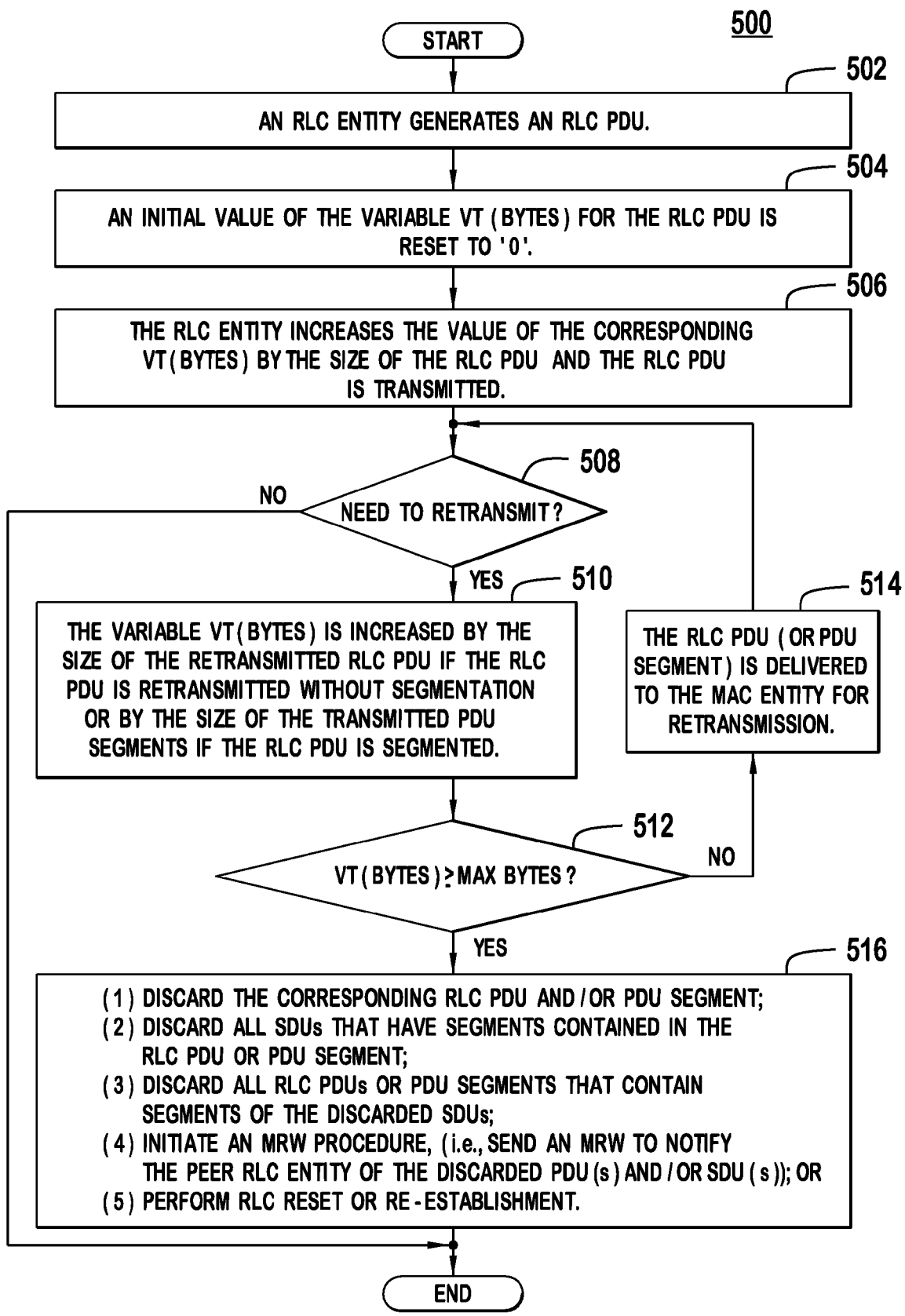
FIG. 5 is a flow diagram of a process for packet discard and/or RLC re-establishment in accordance with a second embodiment.

FIG. 5 is a flow diagram of a process 500 for RLC re-establishment and/or packet discard in accordance with the second embodiment. An RLC entity generates an RLC PDU (step 502). An initial value of the variable VT(Bytes) for the RLC PDU is reset to '0' (step 504). The RLC entity increases the value of the corresponding VT(Bytes) by the size of the RLC PDU and the RLC PDU is transmitted (step 506). Creation and reset of the VT(Bytes) at the time of initial transmission of the RLC PDU at steps 504 and 506 are optional. The state variable VT(Bytes) may not be created at the time of initial transmission of the RLC PDU, but may be created later if retransmission of the RLC PDU occurs or is scheduled to occur. The state variable VT(Bytes) may be initialized to zero and incremented at the time of initial transmission (or at the time of first retransmission if VT(Bytes) is created at the time of first retransmission) and may be incremented at each subsequent transmission. Alternatively, the state variable VT(Bytes) may be initialized to zero at the time of initial transmission (or at the time of first retransmission if VT(Bytes) is created at the time of retransmission) and may be incremented at each subsequent transmission.

After transmission of the RLC PDU, it is determined whether the RLC PDU needs to be retransmitted (step 508). If the RLC PDU does not need to be retransmitted, (e.g., by receiving an ACK), the process 500 ends. If the RLC PDU needs to be retransmitted, (e.g., by receiving a NACK), the RLC PDU may be segmented. The variable VT(Bytes) is increased by the size of the retransmitted RLC PDU if the RLC PDU is retransmitted without segmentation or by the size of the transmitted PDU segments if the RLC PDU is segmented (step 510). For example, after transmitting an RLC PDU, the variable VT(Bytes) is increased by the size of the RLC PDU. If a NACK is received for the RLC PDU and the RLC PDU is segmented into three PDU segments, the variable VT(Bytes) is increased by the size of the RLC PDU. After transmitting the three PDU segments, if one PDU segment is NACKed and retransmitted, the variable VT(Bytes) is increased by the size of the retransmitted PDU segment.

It is then determined whether VT(Bytes) is equal to or greater than MaxBytes (step 512). If VT(Bytes) is smaller than MaxBytes, the RLC PDU or its PDU segments are delivered to the MAC entity for retransmission at step 514 and the process 500 returns to step 508.

If VT(Bytes) equals to or greater than MaxBytes, one or more of the following is performed (step 516):

(1) Discard the RLC PDU and its PDU segments;
(2) Discard all RLC SDUs that have segments contained in the RLC PDU or its PDU segments;
(3) Discard all RLC PDUs or PDU segments that contain segments of the discarded RLC SDUs;
(4) Initiate an MRW procedure, (i.e., send an MRW command to notify the peer RLC entity of the discarded PDU(s) and/or SDU(s)); and
(5) Initiate RLC reset or re-establishment.

Alternatively, the variable VT(Bytes) may be increased when the RLC PDU (or PDU segments) is scheduled for transmission or retransmission, (e.g., after the RLC entity receives a NACK but before segmenting the RLC PDU). For example, after transmitting an RLC PDU, the variable VT(Bytes) is incremented by the size of the RLC PDU. If a NACK is received and the RLC PDU is scheduled for retransmission, the variable VT(Bytes) is increased by the size of the RLC PDU. Assuming that the RLC PDU is segmented into three PDU segments, the three PDU segments are transmitted. If one PDU segment is NACKed and scheduled for retransmission, the variable VT(Bytes) is increased by the size of the NACKed PDU segment.

Alternatively, the initial RLC PDU size may not be included in the VT(Bytes) and only the size of retransmitted RLC PDU or PDU segment(s) may be accumulated in the VT(Bytes).

The threshold MaxBytes may be a configurable parameter or may be derived from another parameter. The threshold MaxBytes may be made flexible and be calculated for each RLC PDU based on the initial RLC PDU size. This provides better performance especially considering that the segmentation is performed in accordance with the TB size which implies a flexible PDU size. For example, MaxBytes may be calculated using a factor, (i.e. multiple), that is multiplied by the initial size of the PDU as follows:

$$\text{MaxBytes}=\text{MaxBytesFactor}*(\text{Size of Initial RLC PDU}).$$

The MaxBytesFactor may be an IE that is configurable by an RRC entity. Such factor or multiplier may have other plausible names, such as "Transmission Size Factor" or "Retransmission Size Factor", etc. The advantage of this approach is that one may control the amount of times that the bytes of an RLC PDU can get (re)transmitted. For example, using a MaxBytesFactor of 3, one can ensure that the data contained in an RLC PDU will not be transmitted or (re)transmitted more than 3 times. The factor may be a real number or an integer.

In accordance with a third embodiment, the number of transmissions or retransmissions is counted both on a per RLC PDU and on a per PDU segment basis. One state variable is generated for an initial RLC PDU and each PDU segment that results from the initial RLC PDU, respectively. When creating an RLC PDU, one corresponding state variable VT0(Trans) is created for the initial RLC PDU. When the RLC PDU is segmented for retransmission, one state variable VTi(Trans) is created for each PDU segment i.

Two parameters, MaxTrans and VTi(Trans), are defined. MaxTrans is a threshold for deciding whether an RLC PDU or a PDU segment needs to be discarded or not. More than one threshold value may be specified, (i.e., MaxTrans_i), depending on the level of re-segmentation. VTi(Trans) is a state variable counting the number of times an RLC PDU or a PDU segment has been scheduled to be transmitted or retransmitted. There is one VTi(Trans) for each PDU or PDU segment, and each VTi(Trans) is incremented by one every time the corresponding RLC PDU or PDU segment is scheduled to be transmitted or retransmitted. The initial value of VTi(Trans) is 0.

Figure 6:
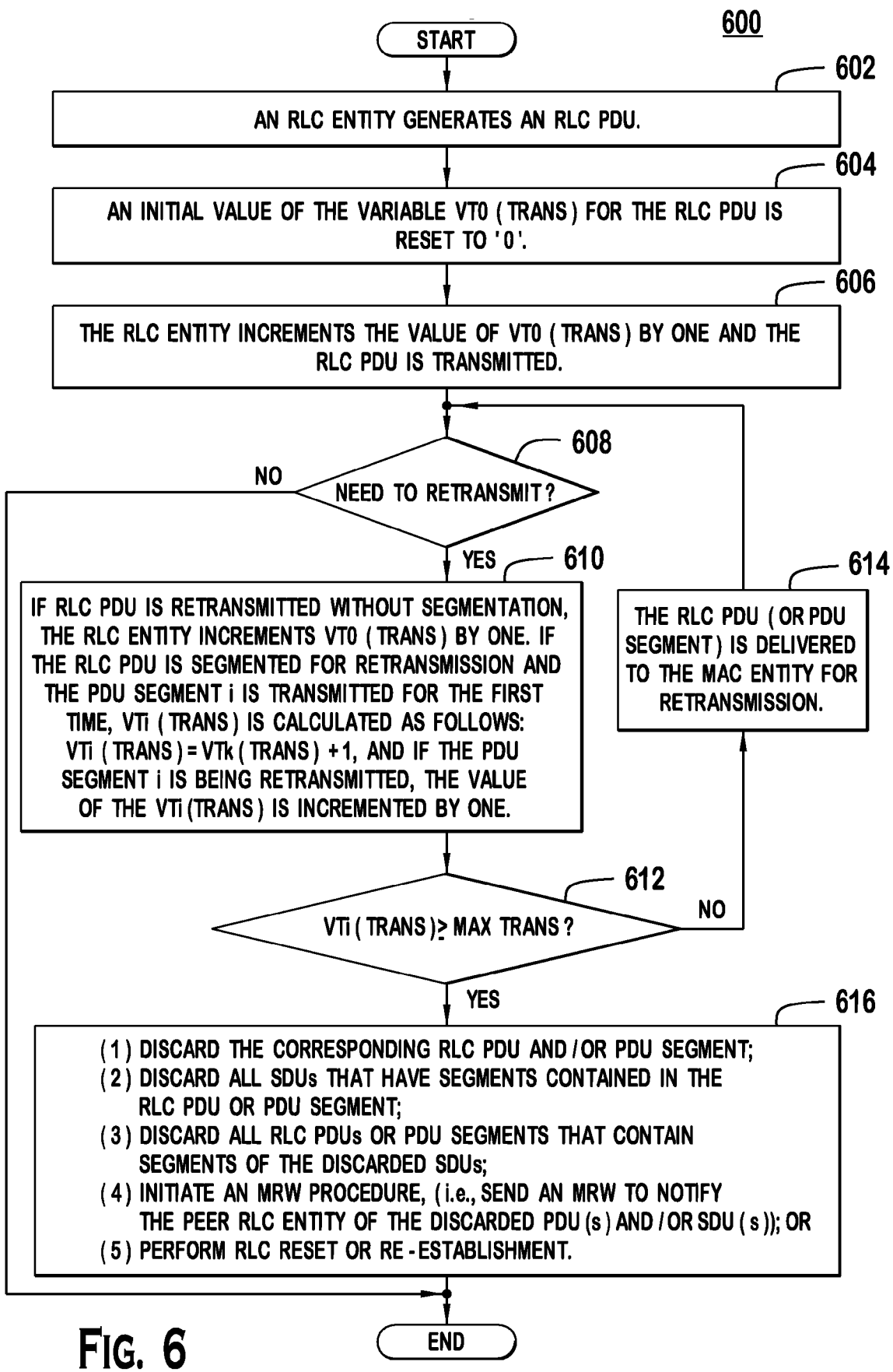
FIG. 6 is a flow diagram of a process for packet discard and/or RLC re-establishment in accordance with a third embodiment.

FIG. 6 is a flow diagram of a process 600 for RLC re-establishment and/or packet discard in accordance with the third embodiment. An RLC entity generates an RLC PDU (step 602). An initial value of the variable VT0(Trans) for the RLC PDU is reset to '0' (step 604). The index i=0 is used to refer to the initial RLC PDU. The RLC entity increments the value of the corresponding VT0(Trans) by one and the RLC PDU is transmitted (step 606).

After transmission of the RLC PDU, it is determined whether the RLC PDU needs to be retransmitted (step 608). If the RLC PDU does not need to be retransmitted, (e.g., by receiving an ACK), the process 600 ends. If the RLC PDU needs to be retransmitted, (e.g., by receiving a NACK), the RLC PDU may be segmented.

If RLC PDU is retransmitted without segmentation, the RLC entity increments VT0(Trans) by one, and if the RLC PDU is segmented for retransmission, (i.e., if an PDU segment i is transmitted), the RLC entity updates VTi(Trans) as follows (step 610):

If the PDU segment i is transmitted for the first time, the value of the corresponding VTi(Trans) is calculated as follows:

$$VTi(Trans) = VTk(Trans) + 1,$$

where k is the index referring to the RLC PDU or PDU segment that is the parent (or the predecessor) of this PDU segment i; and If the PDU segment i is being retransmitted, the value of the VTi(Trans) is incremented by one.

It is then determined whether, for any index i, VTi(Trans) is equal to or greater than MaxTrans (step 612). If VTi(Trans) is smaller than MaxTrans, the RLC PDU (or PDU segment) is delivered to the MAC entity for retransmission at step 614 and the process 600 returns to step 608.

If VTi(Trans) equals to or greater than MaxTrans, one or more of the following actions is performed (step 616):

(1) Discard the corresponding RLC PDU and/or PDU segment;

(2) Discard all SDUs that have segments contained in the RLC PDU or PDU segment;

(3) Discard all RLC PDUs or PDU segments that contain segments of the discarded SDUs;

(4) Initiate an MRW procedure, (i.e., send an MRW to notify the peer RLC entity of the discarded RLC PDU(s) and/or RLC SDU(s)); and (5) Initiate RLC reset or re-establishment.

Alternatively, only the number of retransmissions may be counted, and the initial transmission may not be counted in VT0(Trans) of an RLC PDU. The variable VTi(Trans) may be created at the time of retransmission.

Alternatively, more than one counter (state variable) may be used for the initial RLC PDU. The counters may be allocated to calculate the number of (re)transmission for different data ranges within the RLC PDU, and updated whenever an RLC PDU or PDU segment that contains data that belongs to such data range is transmitted. For example, for each RLC PDU, (i.e., an RLC PDU that is transmitted for the first time), N VTn(Trans) variables, n=0 ... (N-1), are initialized to '0'. Each of the N VTn(Trans) variables corresponds to one of N data ranges within the RLC PDU. Each time an RLC PDU or PDU segment is scheduled for transmission or retransmission, if that RLC PDU or PDU segment contains data belonging to the range associated with a particular VTn(Trans), the RLC entity increments the value of the corresponding VTn (Trans) by 1. If the RLC PDU or PDU segment contains data associated with more than one data range, more than one corresponding VTn's are incremented.

In accordance with a fourth embodiment, a timer, (Discard_Timer), is started for an RLC PDU upon its first transmission. The timer is associated with the initial RLC PDU.

Figure 7:
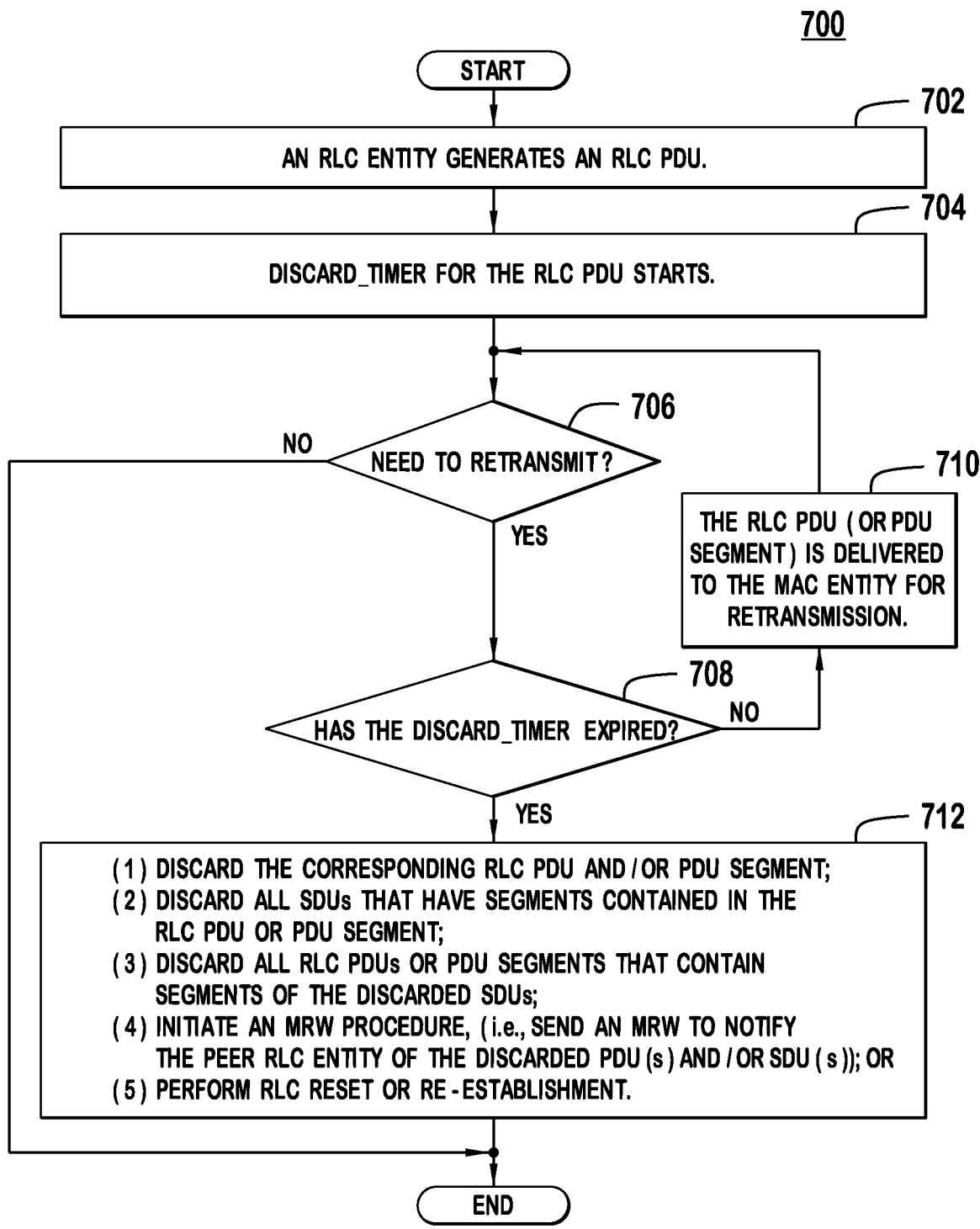
FIG. 7 is a flow diagram of a process for packet discard and/or RLC re-establishment in accordance with a fourth embodiment.

FIG. 7 is a flow diagram of a process 700 for RLC re-establishment and/or packet discard in accordance with the fourth embodiment. An RLC entity generates an RLC PDU (step 702). Discard_Timer for the RLC PDU starts (step 704). After transmission of the RLC PDU, it is determined whether the RLC PDU needs to be retransmitted (step 706). If the RLC PDU does not need to be retransmitted, (e.g., by receiving an ACK), the process 700 ends. If the RLC PDU needs to be retransmitted, (e.g., by receiving a NACK), the RLC PDU may be segmented.

At the time of retransmission of the RLC PDU or PDU segment, it is determined whether the Discard_Timer has expired (step 708). If the Discard_Timer has not expired, the RLC PDU or PDU segment is delivered to an MAC entity for transmission at step 710 and the process 700 returns to step 706. If the Discard_Timer has expired, one or more of the following actions is performed (step 712):

(1) Discard the corresponding RLC PDU and/or PDU segment;

(2) Discard all SDUs that have segments contained in the RLC PDU or PDU segment;

(3) Discard all RLC PDUs or PDU segments that contain segments of the discarded SDUs;

(4) Initiate an MRW procedure, (i.e., send an MRW to notify the peer RLC entity of the discarded PDU(s) and/or SDU(s)); and (5) Initiate RLC reset or re-establishment.

The initial value of the Discard_Timer may be a specified value, a value that is related to, (e.g., the remainder of), the RLC SDU discard timer, or a value that is related to, (e.g., the remainder of), the PDCP SDU/PDU discard timer.

In the fourth embodiment, only one timer (state variable) may be associated with the initial RLC PDU. Alternatively, a separate timer (state variable) is associated with each PDU segment and initiated when a PDU segment is transmitted. Hence, every RLC PDU or PDU segment has its own timer that is started upon the first transmission (not the retransmission) of the PDU or PDU segment, respectively.

The parameters described above may be configured via RRC signaling. Those parameters include MaxTotalTrans, MaxTotalTrans_i, "No_discard after MaxTotalTrans of transmissions", "SDU (or PDU) discard after MaxTotalTrans of transmissions", MaxBytes, MaxBytesFactor, "No_discard after MaxBytes of transmissions", "SDU (or PDU) discard after MaxBytes of transmissions", MaxTrans, MaxTrans_i, "No_discard after MaxTrans of transmissions", "SDU (or PDU) discard after MaxTrans of transmissions", discard timer value, "No_discard after timer", and "SDU (or PDU) discard after timer".

There may be different thresholds or timer values for different initial PDUs. The described configuration parameters are optional, and some of them may or may not exist. The names of the parameters may be different. For example, VT(Bytes) or MaxBytes may be named differently such as VT(DAT) or MaxDAT.

The above parameters may be specified as IEs that may be carried in any RRC message. For example, the parameters may be carried in RRC connection reconfiguration message, RRC connection re-establishment message, or any other RRC messages. Those RRC messages may be exchanged at radio bearer (RB) setup, handover, radio link failure event, or any other events. The IEs may be included as part of a larger IE. The IEs may be applied on a per-Radio Bearer Basis.

The packet discard condition for the threshold may be set differently. For example, instead of "equal to or greater than", "greater than" may be used.

The embodiments may be applied to an RLC SDU instead of an RLC PDU. The state variables disclosed herein may be associated with an RLC SDU instead of an RLC PDU. The embodiments are applicable to both RLC AM and UM.

The embodiments are applicable even if terminologies change. For example, if the term "PDU segment" is replaced by another term, or if the term "PDU" is defined to encompass any packet that is outputted from the RLC including "PDU segment".

The embodiments are still applicable even if there are future changes or modifications to the RLC sub-layer's functionality. For example, the embodiments are still applicable if SDU re-segmentation is employed instead of PDU re-segmentation. The same embodiments for PDU re-segmentation may be applied in the case of SDU re-segmentation, (e.g., the SO will indicate the (starting) position of the segment within the original SDU, (e.g., in bytes), and the SL will indicate the length of the segment, (e.g., in bytes). The embodiments may still apply if a different mechanism is used for re-segmentation (other than the segment offset/length approach).

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for triggering radio link control (RLC) re-establishment, the method comprising:
   generating an RLC protocol data unit (PDU);
   transmitting the RLC PDU;
   initializing a state variable to zero on a condition that the RLC PDU is considered for retransmission for a first time;
   incrementing the state variable associated with the RLC PDU on a condition that at least a portion of the RLC PDU is considered for retransmission and is not already pending retransmission;
   bypassing the state variable associated with the RLC PDU on a condition that the at least a portion of the RLC PDU is considered for retransmission and is already pending retransmission;
   performing a threshold test by comparing the state variable associated with the RLC PDU with a predetermined threshold; and
   initiating RLC re-establishment based on the threshold test.

2. The method of claim 1 wherein the state variable is not incremented on a condition that the at least a portion of the RLC PDU considered for retransmission is already in a retransmission buffer.

3. The method of claim 1 further comprising:
   discarding an RLC service data unit (SDU) at least a portion of which is contained in the RLC PDU; and
   discarding an RLC PDU and a PDU segment that contain at least a portion of the discarded RLC SDU.

4. The method of claim 1 further comprising:
   performing a move receive window (MRW) procedure.

5. The method of claim 1 further comprising:
   discarding at least one of the RLC PDU and segments of the RLC PDU.

6. An apparatus for triggering radio link control (RLC) re-establishment, the apparatus comprising:
   an RLC entity configured to generate an RLC protocol data unit (PDU);
   a transmitter is configured to transmit the RLC PDU;
   the RLC entity is configured to set a state variable to zero on a condition that the RLC PDU is considered for retransmission for a first time;
   the RLC entity configured to increment the state variable associated with the RLC PDU on a condition that at least a portion of the RLC PDU is considered for retransmission and is not already pending retransmission;
   the RLC entity configured to bypass the state variable associated with the RLC PDU on a condition that the at least a portion of the RLC PDU is considered for retransmission and is already pending retransmission;
   the RLC entity configured to perform a threshold test by comparing the state variable associated with the RLC PDU to a predetermined threshold; and
   the RLC entity configured to initiate RLC re-establishment based on the threshold test.

7. The apparatus of claim 6 wherein the RLC entity is configured not to increment the state variable on a condition that the at least a portion of the RLC PDU considered for retransmission is already in a retransmission buffer.

8. The apparatus of claim 6 wherein the RLC entity is configured to discard an RLC service data unit (SDU) at least a portion of which is contained in the RLC PDU and discard an RLC PDU and a PDU segment that contains at least a portion of the discarded RLC SDU.

9. The apparatus of claim 6 wherein the RLC entity is configured to perform a move receive window (MRW) procedure.

10. The apparatus of claim 6 wherein the RLC entity is configured to discard at least one of the RLC PDU and segments of the RLC PDU.

11. A method for triggering radio link control (RLC) re-establishment, the method comprising:
    generating an RLC protocol data unit (PDU);
    transmitting the RLC PDU;

initializing a state variable to zero on a condition that the RLC PDU is considered for retransmission for a first time;

incrementing the state variable associated with the RLC PDU on a condition that at least a portion of the RLC PDU is considered for retransmission and is not already pending retransmission;

bypassing the state variable associated with the RLC PDU on a condition that the at least a portion of the RLC PDU is considered for retransmission and is already pending retransmission;

performing a threshold test by comparing the state variable associated with the RLC PDU with a predetermined threshold, the state variable being increased by a data size of retransmissions of the RLC PDU and its PDU segments; and initiating RLC re-establishment based on the threshold test.

12. A method for triggering radio link control (RLC) re-establishment, the method comprising:

generating an RLC protocol data unit (PDU), the RLC PDU being associated with a state variable VT0;

transmitting the RLC PDU;

segmenting the RLC PDU into PDU segments on a condition that the RLC PDU needs to be retransmitted, each of the PDU segments being associated with a separate state variable VTi, i=1 ... N, N being an integer greater than 1;

initializing a state variable to zero on a condition that the RLC PDU is considered for retransmission for a first time;

incrementing the state variable associated with the RLC PDU on a condition that at least a portion of the RLC PDU is considered for retransmission and is not already pending retransmission;

bypassing the state variable associated with the RLC PDU on a condition that the at least a portion of the RLC PDU is considered for retransmission and is already pending retransmission;

performing a threshold test by comparing the state variable VTi, i=0 ... N with a predetermined threshold, the state variable being incremented by a number of retransmissions of the corresponding RLC PDU and its PDU segment; and on a condition that at least one of the state variables VTi, i=0 ... N, is not smaller than a predetermined threshold, initiating RLC re-establishment.

13. A method for triggering radio link control (RLC) re-establishment, the method comprising:

generating an RLC protocol data unit (PDU);

transmitting the RLC PDU;

initializing state variables to zero on a condition that the RLC PDU is considered for retransmission for a first time;

incrementing the state variables associated with portions of the RLC PDU on a condition that at least a portion of the RLC PDU is considered for retransmission and is not already pending retransmission;

bypassing the state variables associated with the portions of the RLC PDU on a condition that the at least a portion of the RLC PDU is considered for retransmission and is already pending retransmission;

performing a threshold test by comparing state variables to a predetermined threshold, each state variable being associated with a specific portion of the RLC PDU and incremented each time the corresponding portion of the RLC PDU is retransmitted; and initiating RLC re-establishment based on the threshold test.

14. An apparatus for triggering radio link control (RLC) re-establishment, the apparatus comprising:

an RLC entity configured to generate an RLC protocol data unit (PDU);

a transmitter configured to transmit the RLC PDU;

the RLC entity is configured to set a state variable to zero on a condition that the RLC PDU is considered for retransmission for a first time;

the RLC entity configured to increment the state variable associated with the RLC PDU on a condition that at least a portion of the RLC PDU is considered for retransmission and is not already pending retransmission;

the RLC entity configured to bypass the state variable associated with the RLC PDU on a condition that the at least a portion of the RLC PDU is considered for retransmission and is already pending retransmission;

the RLC entity configured to perform a threshold test by comparing the state variable associated with the RLC PDU to a predetermined threshold; and the RLC entity configured to initiate RLC re-establishment based on the threshold test, wherein the state variable is increased by a data size of retransmissions of the RLC PDU and its PDU segments.

15. An apparatus for triggering radio link control (RLC) re-establishment, the apparatus comprising:

an RLC entity configured to generate an RLC protocol data unit (PDU);

a transmitter configured to transmit the RLC PDU;

the RLC entity is configured to set a state variable to zero on a condition that the RLC PDU is considered for retransmission for a first time;

the RLC entity configured to increment the state variable associated with portions of the RLC PDU on a condition that at least a portion of the RLC PDU is considered for retransmission and is not already pending retransmission;

the RLC entity configured to bypass the state variable associated with the RLC PDU on a condition that the at least a portion of the RLC PDU is considered for retransmission and is already pending retransmission;

the RLC entity configured to perform a threshold test by comparing each of a plurality of state variables to a predetermined threshold; and the RLC entity configured to initiate RLC re-establishment based on the threshold test, wherein each of the state variables is associated with a specific portion of the RLC PDU and incremented each time the corresponding portion of the RLC PDU is retransmitted.

* * * * *